US008692655B2

(12) United States Patent
Zimman et al.

(10) Patent No.: US 8,692,655 B2
(45) Date of Patent: Apr. 8, 2014

(54) DYNAMICALLY PROGRAMMABLE RFID TRANSPONDER

(75) Inventors: Christopher William Zimman, London, PA (US); James William Hook, New York, NY (US)

(73) Assignee: Bloomberg Finance L.P., New York, NY (US)

( * ) Notice: Subject to any disclaimer, the term of this patent is extended or adjusted under 35 U.S.C. 154(b) by 1637 days.

(21) Appl. No.: 11/744,932

(22) Filed: May 7, 2007

(65) Prior Publication Data

US 2008/0278325 A1 Nov. 13, 2008

(51) Int. Cl.
*G08B 13/14* (2006.01)

(52) U.S. Cl.
USPC ..................................... 340/10.51; 340/10.52

(58) Field of Classification Search
USPC ......... 340/10.51, 5.53, 5.82, 5.83, 5.61, 5.25, 340/572.1, 572.4; 235/380, 382, 382.5
See application file for complete search history.

(56) References Cited

U.S. PATENT DOCUMENTS

| 5,280,527 | A | | 1/1994 | Gulman et al. |
| 5,310,999 | A | * | 5/1994 | Claus et al. .................... 235/384 |
| 5,430,441 | A | * | 7/1995 | Bickley et al. ............... 340/10.2 |
| 5,832,090 | A | | 11/1998 | Raspotnik |
| 6,181,287 | B1 | | 1/2001 | Beigel |
| 6,285,295 | B1 | | 9/2001 | Casden |
| 6,720,866 | B1 | * | 4/2004 | Sorrells et al. ............... 340/10.4 |
| 2002/0047777 | A1 | | 4/2002 | Casden |
| 2003/0105964 | A1 | | 6/2003 | Brainard et al. |
| 2004/0004559 | A1 | | 1/2004 | Rast |
| 2004/0124248 | A1 | | 7/2004 | Selker |
| 2005/0001712 | A1 | | 1/2005 | Yarbrough |
| 2005/0035200 | A1 | * | 2/2005 | Hendrick ...................... 235/441 |
| 2005/0081040 | A1 | | 4/2005 | Johnson et al. |
| 2005/0168340 | A1 | | 8/2005 | Mosher, Jr. et al. |
| 2005/0218215 | A1 | | 10/2005 | Lauden |
| 2005/0237295 | A1 | | 10/2005 | Anderson |
| 2005/0242921 | A1 | | 11/2005 | Zimmerman et al. |
| 2005/0253683 | A1 | | 11/2005 | Lowe |
| 2006/0022794 | A1 | | 2/2006 | Determan |
| 2006/0061482 | A1 | * | 3/2006 | Monney et al. .......... 340/825.52 |
| 2006/0076404 | A1 | | 4/2006 | Frerking |

(Continued)

FOREIGN PATENT DOCUMENTS

| GB | 2 420 098 A | 5/2006 |
| WO | 2005036473 A1 | 4/2005 |

OTHER PUBLICATIONS

Henrici et al., Pervasive Computing and Communications Workshops, 2004. Proceedings of the Second IEEE Conference, Piscatawny, NJ, USA, IEEE, Mar. 14, 2004, pp. 149-153.

(Continued)

*Primary Examiner* — Edwin Holloway, III
(74) *Attorney, Agent, or Firm* — Frank J. DeRosa; Frommer Lawrence & Haug LLP

(57) ABSTRACT

A radio frequency transponder, or a device that comprises a radio frequency transponder, wherein the radio frequency transponder is operative in invoking self-programming of data stored in the radio frequency transponder. In some implementations the radio frequency transponder selectively enables the transmission of a unique identifier by selectively programming the unique identifier stored in the radio frequency transponder. In various implementations, the radio frequency transponder programs data stored in the transponder by generating a signal that is reactively coupled to the antenna of the radio frequency transponder.

12 Claims, 4 Drawing Sheets

(56) References Cited

U.S. PATENT DOCUMENTS

| | | | |
|---|---|---|---|
| 2006/0208066 A1* | 9/2006 | Finn et al. | 235/380 |
| 2006/0219776 A1 | 10/2006 | Finn | |
| 2006/0226951 A1* | 10/2006 | Aull et al. | 340/5.61 |
| 2007/0018819 A1 | 1/2007 | Streeb et al. | |

OTHER PUBLICATIONS

PCT International Search Report completed on Jun. 20, 2008 in counterpart International Application No. PCT/US2008/056481.

plusID Universal Biometric Device, Privaris, Datasheet 06.06, Copyright 2006.

Broadcom Launches World's First Secure Processor With Integrated RFID to Secure Personal Authentication Applications, http://www.broadcom.com/press/release.php?id+876531&printable=1 (Jun. 27, 2006).

Singapore Search Report, 4 pgs., Sep. 2010, Application No. 200907231-5.

* cited by examiner

DYNAMICALLY PROGRAMMABLE RFID TRANSPONDER

TECHNICAL FIELD

The present invention relates to radio frequency transponders, and more particularly, to reprogrammable radio frequency transponders, and to a device that comprises a radio frequency transponder and that is operative in invoking self-programming of data stored in the radio frequency transponder.

BACKGROUND

Generally, radio frequency identification (RFID) systems include an RFID transponder (also referred to as an RFID tag or tag), and an RFID reader or interrogator, which may be communicably coupled to a host computer. The reader, which may be configured either as a handheld or a fixed-mount device, includes a transceiver that transmits an electromagnetic interrogation or activation signal for detection by transponders, and that receives signals transmitted by RFID tags (e.g., usually in response to the activation signal). Each RFID transponder stores unique information (e.g., an identification code) and/or other data that may be wirelessly read by the reader or interrogator when the transponder is located close enough to the reader to detect the reader's activation signal. More specifically, the reader receives and decodes unique information and/or data encoded in the tag, and may pass this information to the host computer for processing. In various applications, such as premises or equipment access control, RFID tags are integrated with or otherwise incorporate a biometric sensor to ensure that the RFID tag is in possession of the authorized user to whom the tag was issued.

Depending on the application and corresponding tag design (e.g., type of memory used in the tag), data stored in the tag may be read-only, write once read many (WORM), or read/write. Read-only tags typically are programmed by a manufacturer or distributor with a unique identifier, which in various applications identifies an item to which the tag is attached. WORM and read/write tags provide for field or user programmability of the unique information (e.g., identification) and/or other data stored in the tag. For example, WORM tags are typically used to allow for the unique information to be programmed into the tag by an OEM customer, an end user, or a tag distributor, rather than by the tag manufacturer. Read/write tags further allow the user to change data (e.g., write data to the tag more than one time and/or rewrite or modify data stored in the tag), which may be useful in applications such as those where the tag is used for monitoring processes or transactions experienced by the associated item or device (e.g., work-in-process or maintenance tracking). Accordingly, information or data stored in the tag is programmed at manufacturing and/or in the field by an external programmer (e.g., reader/interrogator).

SUMMARY OF THE INVENTION

Various embodiments of the present invention provide methods and apparatuses for a device comprising a radio frequency transponder to selectively enable the transmission of a unique identifier by selectively programming the unique identifier stored in the radio frequency transponder. Additionally, various embodiments of the present invention provide methods and apparatuses for a device comprising a radio frequency transponder having an antenna to program data stored in the transponder by generating a signal that is reactively coupled to the antenna.

In accordance with some embodiments of the present invention, a radio frequency identification unit, comprises a memory that stores data for transmission by the radio frequency identification unit; an antenna that is operative in transmitting a signal comprising at least a portion of the data; and programming circuitry included within the radio frequency identification unit and that is operative in selectively programming a value of the data for transmission by the radio frequency identification unit. The programming circuitry may selectively program the value according to a unique identifier associated with the radio frequency identification unit. Additionally, the programming of the unique identifier may be conditioned upon biometric authentication of a user by the radio frequency identification unit.

In various embodiments, the programming circuitry is operative in programming the value of the data by providing a programming signal that is reactively coupled to the antenna. For instance, the antenna may be configured as a winding inductively coupled to a programming-winding that is coupled to the programming circuitry such that the programming signal is operative in driving the programming winding.

In accordance with various embodiments of the present invention, a method of controlling data transmitted by an RFID unit that comprises a radio frequency identification transponder comprises selectively programming a data value stored in a memory of the radio frequency identification transponder, the programming being performed by circuitry disposed within the RFID unit and independent of a device external to the RFID unit; and the radio frequency identification transponder generating a signal for transmission by the radio frequency identification transponder, the signal comprising the data value. In some implementations, the data value may be conditioned upon biometric authentication of a user by the RFID unit. Additionally or alternatively, the data value may be a valid access code that is programmed into the memory for a predetermined time period. Upon expiration of the predetermined time period, the data value may be programmed with an invalid access code.

In accordance with various embodiments of the present invention, a radio frequency identification unit comprises a memory that stores data for transmission by the radio frequency identification unit; an antenna that is operative in transmitting a signal comprising at least a portion of the data; and programming circuitry included within the radio frequency identification unit and that is operative in generating a programming signal, wherein the programming signal is reactively coupled to the antenna and operative in programming the data for transmission in memory. The memory and the programming circuitry may be included within at least one transponder integrated circuit. The programming of the data for transmission may be conditioned upon biometric authentication of a user by the radio frequency identification unit. In some implementations, the antenna may be configured as a winding inductively coupled to a programming winding that is coupled to the programming circuitry such that the programming signal is operative in driving the programming winding.

In accordance with some embodiments of the present invention, a method of programming data transmitted by an RFID unit that comprises a radio frequency identification transponder having an antenna for transmission of the data comprises generating a programming signal that is relatively coupled to the antenna and comprises information representing data to be transmitted by the radio frequency identification transponder, the programming signal being generated by circuitry disposed within the RFID unit and independent of a device external to the RFID unit; and the radio frequency identification transponder designating data for transmission based on the programming signal.

It will be appreciated by those skilled in the art that the foregoing brief description and the following detailed description are exemplary and explanatory of this invention, but are not intended to be restrictive thereof or limiting of the advantages which can be achieved by this invention. Additionally, it is understood that the foregoing summary of the invention is representative of some embodiments of the invention, and is neither representative nor inclusive of all subject matter and embodiments within the scope of the present invention. Thus, the accompanying drawings, referred to herein and constituting a part hereof, illustrate embodiments of this invention, and, together with the detailed description, serve to explain principles of this invention.

BRIEF DESCRIPTION OF THE DRAWINGS

Aspects, features, and advantages of embodiments of the invention, both as to structure and operation, will be understood and will become more readily apparent when the invention is considered in the light of the following description made in conjunction with the accompanying drawings, in which like reference numerals designate the same or similar parts throughout the various figures, and wherein.

DETAILED DESCRIPTION OF EMBODIMENTS OF THE INVENTION

Figure 1:
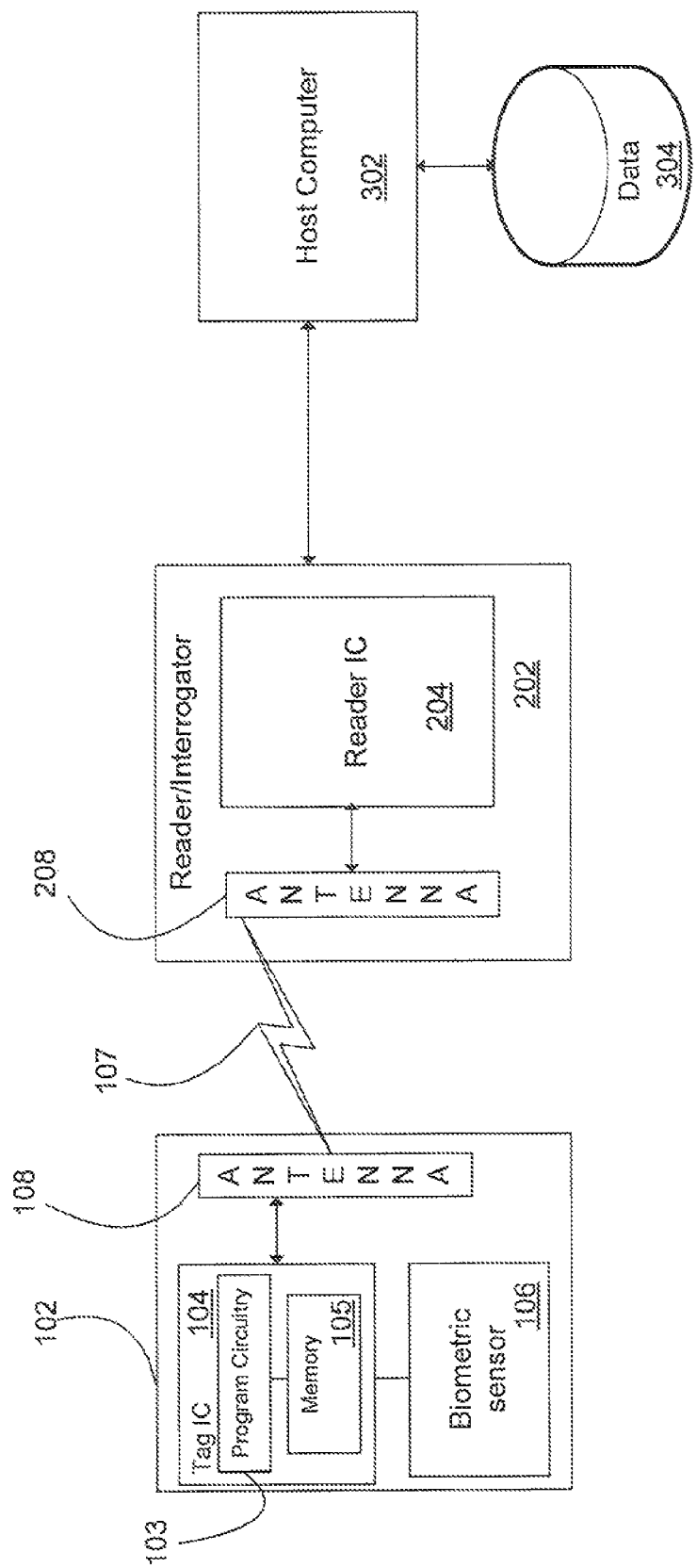
FIG. 1 schematically depicts an illustrative RFID system that may include dynamically programmable RFID tags, in accordance with an embodiment of the present invention.

FIG. 1 schematically depicts an illustrative RFID system 100 that may include dynamically programmable RFID tags, in accordance with an embodiment of the present invention. As shown, RFID system 100 comprises an RFID unit 102 (which includes a programmable RFID transponder and a biometric reader 106), an RFID reader/interrogator 202, and a host computer 302 that has access to a database 304. As will be understood by those skilled in the art in view of the ensuing description, while RFID system 100 is generally representative, and generally described in the context, of an access control system (e.g., for premises or physical assets), a programmable RFID transponder in accordance with embodiments of the present invention may be implemented for any of myriad applications other than or in addition to access control. As will also be understood by those skilled in the art in view of the ensuing description, various physical and/or functional components depicted as separate logical blocks may be integrated (e.g., as a single integrated circuit) or may each comprise one or more monolithic components (e.g., one or more integrated circuits).

RFID unit 102 may be any device, such as a tag, card, key fob, circuit board (e.g., personal computer adaptor card), client device, (e.g., workstation), or other module or platform that incorporates an RFID transponder. In this embodiment, RFID transponder comprises tag integrated circuit (IC) 104 communicably coupled to antenna 108. Typically, tag IC 104 may be fabricated as a low power integrated circuit and antenna 108 may be implemented as an off-chip coil or, in some embodiments, using coil-on-chip technology. Antenna 108 provides for data communication with reader/interrogator 202 via wireless interface 107, and may also provide for power generation (e.g., if unit 102 is a passive device, or otherwise acquires at least some power from the interrogating field). As discussed below, in some embodiments, transponder antenna 108 and tag IC 104 not only detect the interrogating field, but also may detect a programming field transmitted by reader/interrogator 202.

Tag IC 104 includes memory 105 that, depending on the application, may include one or more types of non-volatile and/or volatile memory devices, such as read-only memory (ROM), random access (RAM), and non-volatile programmable memory (e.g., electrically erasable programmable read-only memory (EEPROM)). For instance, ROM-based memory may be used to store security data and the transponder operating system instructions that, in conjunction with processing logic or a processor (which may also be included within tag IC 104), is operative in handling internal housekeeping functions and controlling dataflow among the various functional components of tag IC 104 (e.g., interrogation response delay timing, power supply switching). RAM-based memory may be used to facilitate temporary data storage during transponder interrogation and response. Non-volatile programmable memory may be used to store unique information (e.g., unique identifier) and any other data that must be retained when the device is in a quiescent state (e.g., if RFID unit 102 is implemented as a passive device) or a power-saving "sleep" state (e.g., if RFID unit 102 is implemented as an active device).

Tag IC 104 also includes interface circuitry (e.g., including transceiver circuitry, such as a duplexer, a power amplifier, and a modulator/demodulator) for communication with reader/interrogator 202 (which includes reader IC 204) via RF antenna 108. Memory 105 may also include data buffers that are used for temporarily storing incoming data (i.e., data extracted by demodulating the signal received from reader/interrogator 202 via antenna 108) and outgoing data (i.e., data for modulating a signal to be transmitted to reader/interrogator 202 via antenna 108. For passive transponder implementations (or active transponder implementations where additional power is desired), the interface circuitry embodied in tag IC 104 also provides for directing interrogation field energy for powering the transponder.

Tag IC 104 is also communicably coupled to a biometric reader 106 that is included in RFID unit 102. In this embodiment, biometric reader 106 senses fingerprint characteristics; however, in various alternative embodiments, biometric reader may sense alternative or additional biometric characteristics, such as retina, iris, voice pattern, and/or temperature characteristics. Biometric reader 108 may sense the pattern of ridges on a user's finger and output data related to the fingerprint to tag IC 104 for further processing to verify the user's identity. In an alternative implementation, biometric reader 106 may itself process the sensed fingerprint characteristics, and output to tag IC 104 a signal indicative of whether a users identity is verified. Depending on the implementation, fingerprint template information used for verifying the scanned fingerprint may be stored in memory 105 or in biometric reader 106.

In some embodiments, where the RFID unit's transponder is programmable by reader/interrogator 202, tag IC 104 provides (via software, firmware, and/or hardware) for recognizing a programming signal and performing the necessary data transfer processes to store the programming data (e.g., unique identifier and/or other data) received from reader/interrogator 202. Programming instructions may be identified according to a particular code (e.g., a prefix or header) in the signal received from the reader/interrogator 202. In some implementations, for programming to be enabled, the programming field must also exceed a certain threshold (e.g., greater than required for an interrogation signal to elicit a response from the transponder).

In accordance with some embodiments of the present invention, tag IC 104 also includes logic and/or processing circuitry (illustrated, in this embodiment as programming circuitry 103, which may comprise, in some embodiments, a processor) operative in initiating (i.e., independently of a programming signal received from an external device such as reader/interrogator 202) and invoking programming of unique information and/or other data into one or more memory locations (e.g., a register storing outgoing data) in tag IC 104. For instance, in some embodiments, one or more memory locations store data for modulating the signal transmitted by antenna 108, and tag IC is capable of rewriting the data stored in at least one of these locations. Alternatively or additionally, such logic and/or processing circuitry may be operative in designating (e.g., by specifying an address pointer) which of a plurality of codes or other data strings stored in separate memory portions will be read out for modulating the signal to be transmitted by antenna 108. As such, as will be further understood below, RFID unit 102 may be configured to selectively transmit one or more data blocks (e.g., codes) specified by the RFID unit itself. Further, it will be understood that, in accordance with various embodiments of the present invention, RFID transponder 102 may provide for selectively transmitting a first code (e.g., a valid code) upon biometric authentication by dynamically programming the code stored in a memory location designated for modulating at least a portion of outbound transmissions, or, similarly, by dynamically designating the memory location(s) from which code data will be read to modulate the signal to be transmitted.

The values of the one or more codes dynamically programmed or designated by the RFID transponder may be generated in any of a various ways. For instance, one or more of these codes may be pre-stored in the transponder upon manufacture or in the field (e.g., using a reader/interrogator configured for programming). Alternatively or additionally, at least a portion of one or more of the codes may be generated based on a pseudo-random number generator, thus allowing for rolling codes or time synchronized codes (e.g., such as the RSA SecurID authentication code generating mechanism) or the like.

It will be understood in view of the foregoing description of RFID unit 102 depicted in FIG. 1 that while, in some embodiments, circuitry (e.g., a processor) operative in initiating selective programming of codes for transmission by the RFID unit 102 and in interfacing with biometric reader 106 may be integrated with tag IC 104, such circuitry may be implemented as a separate integrated circuit (e.g., separate processor), which, in some embodiments, does not communicate code programming related signals (e.g., a signal initiating and/or invoking or effecting programming of a code transmitted by the RFID unit) via a conductive path to the tag IC (e.g., because tag IC 104 may not be configured for interfacing with another device for programming via conductive communication, etc.). As will be understood in view of the ensuing description, however, in some embodiments of the present invention circuitry (e.g., a processor) included within an RFID unit may be operative via reactive coupling to the tag IC, and independent of a programming signal received by the RFID unit from a device external to the RFID unit, in initiating and/or invoking selective programming of codes for transmission by the RFID unit.

Figure 2:
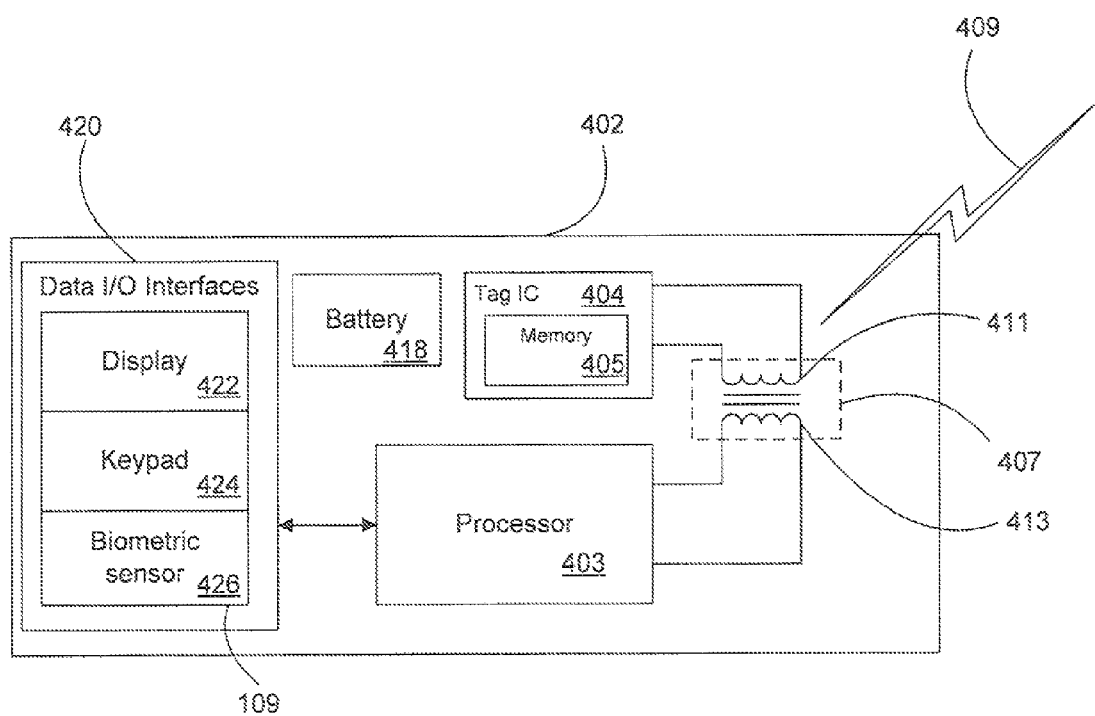
FIG. 2 schematically depicts another RFID unit that may be used in the RFID system of FIG. 1, in accordance with an embodiment of the present invention.

For instance, FIG. 2 schematically depicts an RFID unit 402 that may be used in RFID system 100 in addition to, or as an alterative to, RFID unit 102, in accordance with various embodiments of the present invention. As shown, RFID unit 402 comprises a processor 403, data input/output (I/O) interfaces 420, tag IC 404, battery 418, and a coil component 407. In this embodiment, RFID unit 402 may be implemented as a compact, portable device that provides a user with various applications and functionality in addition to access control. For instance, RFID unit 402 may provide for certain personal digital assistant, data storage (e.g., flash drive; flash memory and I/O interface not shown), and media player (e.g., MP3 player) functionality.

Processor 403 is communicably coupled to I/O interfaces 420, and may execute code to provide a graphical user interface via I/O interfaces 420, as well as to provide routines or applications that may be provided by RFID unit 102. Processor 403 may include on-chip memory (e.g., non-volatile) and may also include off-chip memory (e.g., RAM, not shown). Display 422 may be a compact liquid crystal display. Depending on the particular applications of RFID unit 402, keypad 424 may be implemented as a compact QWERTY keypad or as a smaller number (e.g., four or five) of keys or buttons that allow for cursor movement and/or menu item selection. In this embodiment, in addition to being used for fingerprint scanning for user authentication, biometric sensor 426 also provides for touch input to interact (e.g., navigation and selection) with the user interface displayed on display 422.

In this embodiment, during biometric authentication, processor 403 (rather than the tag IC as for the embodiment of FIG. 1) receives a signal from biometric sensor 426. Depending on the implementation, the signal provided by biometric sensor 426 may be either a signal indicating whether biometric sensor 426 validated the user's biometric authentication, or a signal representing fingerprint characteristics (e.g., the characteristics themselves or a function thereof, such as a hash function). In implementations where processor 403 receives a signal representing scanned fingerprint characteristics, processor 403 is operative in authenticating the user identity by comparing the scanned fingerprint characteristics signal with fingerprint template information stored in a memory (e.g. non-volatile) accessible to processor 403 (e.g., on-chip EEPROM). In some implementations, the template information may be stored in tag IC memory 405, which may be accessed by processor 403 via a bus (not shown) coupling tag IC 404 and processor 403.

In this embodiment, while tag IC 404 does not directly receive and process a signal from biometric sensor 426; those skilled in the art will understand that tag IC 404 is operative in performing the same or similar functions as tag IC 104 with respect to storing unique data and/or other data, and to communicating with reader/interrogator 202 via wireless link 409, including transmitting a unique identifier and/or other data, detecting the interrogation field, and defecting a programming field (in implementations allowing programming by the reader/interrogator 202). While in this embodiment tag IC 404 and processor 403 are depicted as a separate blocks, those skilled in the art will understand that in some embodiments, the functionality of processor 403 may be incorporated into tag IC 404, which may comprise one or more integrated circuit chips. Additionally, while not depicted as such, in various alternative embodiments, tag IC may be communicably coupled to processor 403, allowing, for example, for the tag IC to send an interrupt to processor 403 upon detecting an interrogation field, with processor 403 then prompting the user via display 422 (and/or by other means, such as audio or vibration) to swipe their finger on biometric sensor 426.

As depicted, for communications via wireless link 409, tag IC 404 is coupled to antenna winding 411, which is part of coil component 407. More specifically, coil component 407 comprises antenna winding 411 inductively coupled to programming winding 413, and may be fabricated as component separate from or monolithically integrated with tag IC 404, and may also be fabricated as a planar inductive element. In this embodiment, the inductive coupling of windings 411 and 413 is enhanced by providing these windings about a common magnetic core (e.g., a high magnetic permeability material, such as a binary or ternary alloy comprising NiFe or other high permeability materials).

Programming winding 413 is coupled to processor 403, which may be implemented, for example, as a microcontroller that includes pulse width modulation interface circuitry for driving winding 413 to program tag IC 404. As will be understood, in various alternative embodiments, pulse width modulation circuitry may be implemented as one or more separate integrated circuit chips interfaced to processor 403. Accordingly, in this embodiment, processor 403 may selectively drive winding 413 with a signal that is inductively coupled to winding 411 and detected by tag IC 404 as a programming signal, thus allowing RFID unit 402 to reprogram itself (e.g., programming unique data and/or other data) using the same interface as would be used by reader/interrogator 202 for programming RFID unit (if such programming by reader/interrogator 202 were enabled). As such, a self-programming RFID unit in accordance with such an embodiment may be implemented by using an off-the-shelf RFID transponder integrated circuit coupled with an inductively coupled antenna rather than by, for example, designing a special purpose transponder IC. As will be understood by those skilled in the art, alternative embodiments that employ self-programming of the RFID unit via the tag antenna are not limited to self-programming via inductive coupling to the tag antenna, but may be implemented via capacitive coupling to the tag antenna. That is, in accordance with various embodiments of the present invention, the programming signal may be reactively coupled to tag antenna.

As for wireless programming of RFID unit 402 by a reader/interrogator, the programming signal generated by processor 403 has an appropriate nominal center frequency and bandwidth for reception by tag IC 404, and programming instructions from processor 403 may be identified according to a particular code (e.g., a prefix or header) and/or by the programming field exceeding a certain threshold (e.g., greater than a maximum field associated with an interrogation signal). In some embodiments, tag IC 404 may distinguish programming signals generated by processor 403 from programming signals generated by reader/interrogator 202 according to different codes (e.g., prefix or header data) associated with each of these programming signals. In various implementations, the programming signal generated by processor 403 may include the actual data values (e.g., unique identifiers or other data, such as process flow data) to be programmed into tag IC memory 405 and/or designators (e.g., pointers or references) to data values pre-stored in memory 405.

Figure 3:
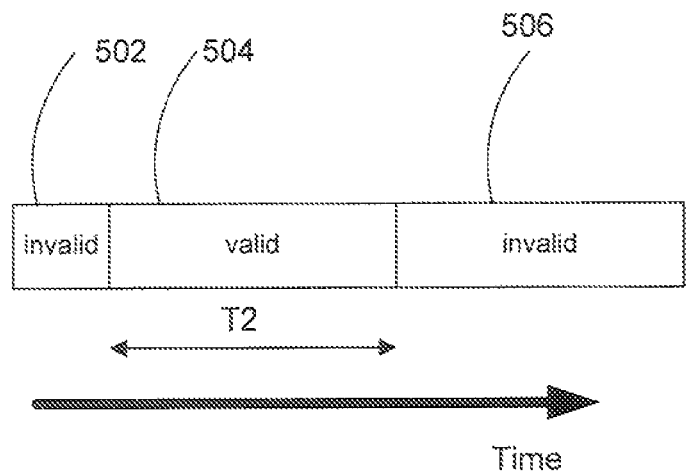
FIG. 3 schematically depicts an illustrative temporal dependence of a data value stored in a memory block that is accessed by a transponder, in accordance with an embodiment of the present invention.
Figure 4:
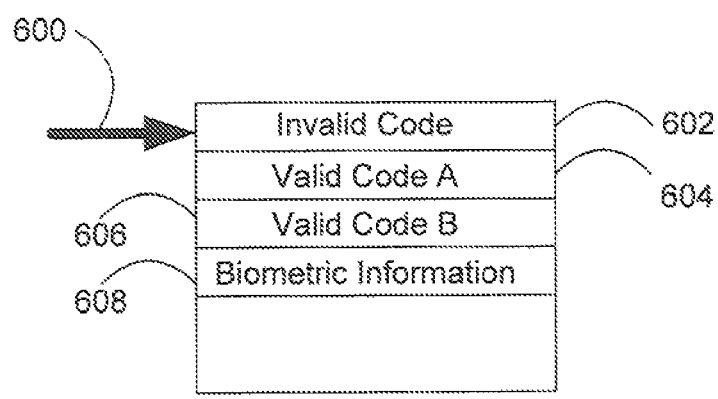
FIG. 4 schematically depicts a tag IC memory organization in which separate memory locations store various codes that may be transmitted by the tag, in accordance with an embodiment of the present invention.

As will be appreciated, in accordance with embodiments of the present invention, including embodiments according to RFID units 102 and 402, specifying data values to be written into memory or specifying pointers to pre-stored data values may involve designating or otherwise identifying data that will be transmitted by RFID unit 202 or 402 in response to an interrogation signal, or otherwise transmitted by the RFID unit in response to user input invoking such a transmission. As indicated above, in some embodiments, such transmitted data may be read out from a fixed memory block (e.g., one or more registers) that is updated with the current data to be transmitted. Alternatively, possible data values to be transmitted may be stored in different memory locations, and processing or control logic (e.g., implemented by tag IC 104 control logic or processor 403) specifies which data value will be read out for modulating the transmission signal. FIGS. 3 and 4 schematically depict these respective methods for designating biometric dependent access control data for transmission by RFID units 102 and 402 to reader/interrogator 202. As each of these methods involves changing the active or operative data in the tag, whether by writing new data info a given memory location or by dynamically identifying a memory location containing data, each of these methods is referred to herein as programming the tag.

More specifically, FIG. 3 schematically depicts an illustrative temporal dependence of a data value stored in a memory block (e.g., one or more registers) that is accessed by the transponder (e.g., transponder IC 104 or 404) for transmitting a signal to reader/interrogator 202. In a first state 502, RFID tag stores an invalid code. In, for example, premises access control applications, such an invalid code would result in access to the premises being denied. In some implementations of premises access control systems, however, such an invalid access code may be considered a valid egress code used by the RFID access control system to grant or otherwise monitor egress from the premises of an individual whose identity is not authenticated upon egress. That is, in some embodiments, the invalid code may also be considered or referred to as an identity-independent code, indicating that it is a code programmed into the tag when biometric authentication is not valid or verified. While in this state 502, RFID unit 102 or 402 may transmit the stored invalid or identity-independent code in response to receiving a read signal from reader/interrogator 202. Upon valid biometric verification as discussed herein (e.g., a valid fingerprint input), tag IC 104 or processor 403 programs the memory of the RFID tag IC with a valid code, as represented by state 504. In some embodiments, the valid code may be an encrypted representation of the user's biometric data, using encryption techniques known to those skilled in the art in various embodiments, at least a portion of the valid code may be generated based on a pseudo-random number generator, thus allowing for rolling codes or time synchronized codes (e.g., such as the RSA SecurID authentication code generating mechanism) or the like. The valid code in state 504 may be active for a predetermined time period T2. During this time period, RFID tag may transmit the valid code in response to receiving a read signal from a reader/interrogator 202. Upon expiration of time period T2, tag IC 404 or processor 403 reprograms the RFID tag IC memory with the invalid (identity-independent) code, as represented by state 506. In some embodiments, programming of a valid code into the register may also be conditioned on receiving an interrogation signal from reader/interrogator 202 or on the user providing an additional input (e.g., via keypad 424) indicating that a transmission should be generated.

It will be understood that in some embodiments, such as those allowing for rolling codes or time synchronized codes (e.g., such as the RSA SecurID authentication code generating mechanism), an invalid code (e.g., codes 502 and 506 in FIG. 3) may not be programmed into memory after a valid code expires but may be the expired valid code. For instance, referring to FIG. 3, in such implementations invalid code 506 is the same code (e.g., same value) as valid code 504, but becomes invalid upon expiration of time period T2. Similarly, in such an embodiment, code 502 may be identical to an immediately preceding expired valid code (not shown). In such implementations, a valid code need not be programmed, written, or otherwise replaced with a different valued invalid code upon expiration of the given time period because the host end system is capable of independently determining the time dependent code. Accordingly, in such embodiments, the tag IC and/or its associated processor does not program (e.g., including rewriting, or otherwise referencing or specifying) a different code upon expiration of the valid code, but does program a new valid code in the event that such a code is to be active (e.g., upon biometric authentication).

As described hereinabove, in alternative implementations, various codes or data that may be transmitted by the tag may be stored in separate memory locations, and a reference (e.g., pointer) to one of these separate memory locations is updated to identify the current memory location from which data for transmission will be read, as schematically illustrated by FIG. 4. More specifically, FIG. 4 schematically depicts a tag IC memory organization in which separate memory locations 602, 602, and 606 store various codes (i.e., in order, an invalid code; valid code A; and valid code B) that may be transmitted by the tag. In this example, valid code A and valid code B illustrate that in some implementations more than one valid code may be stored in the tag. For instance, the two codes may be respective valid response codes for accessing different premises or secured resources, or access to certain premises or resources may require exchanging a series of messages involving two response codes (e.g., valid code B may be a hash of valid code A), in embodiments employing rolling or time synchronized codes, the different stored codes may be valid codes applicable to different time periods. This illustrative embodiment also shows that biometric information (e.g., fingerprint template characteristics) may also be stored in the memory (at memory location 608), though such information typically would not be transmitted by the tag to the reader/interrogator. In this implementation, programming of the tag to change the code that will be accessed for transmission involves updating the reference or pointer 600 that identifies the memory location of the code data for transmission by the tag. It is also noted, however, that programming may also involve rewriting values of one or more of the codes stored in the memory (e.g., updating a rolling or time synchronized code portion).

Figure 5:
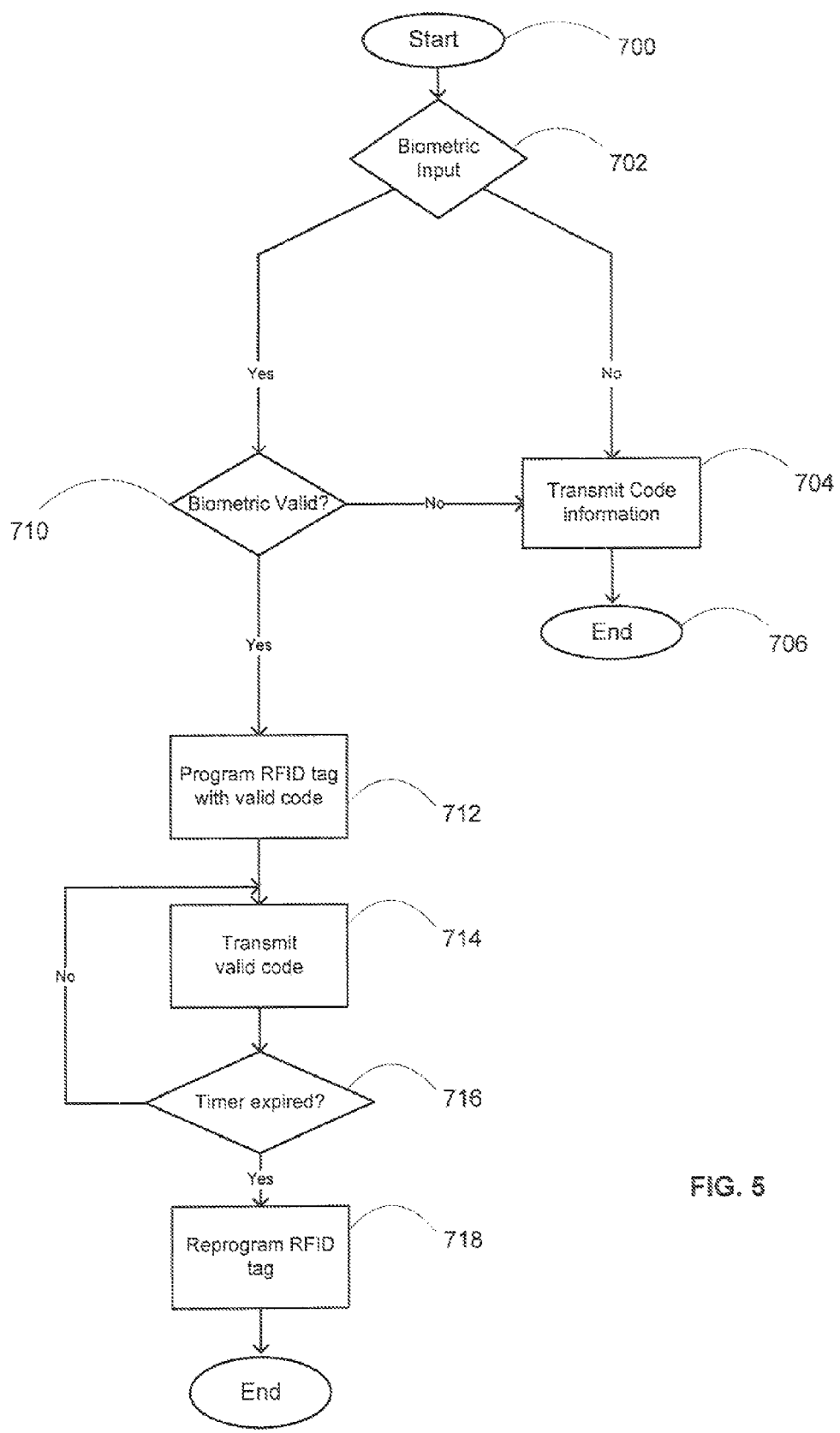
FIG. 5 depicts an illustrative operational flow diagram for biometrically authenticated access control, in accordance with an embodiment of the present invention.

Referring now to FIG. 5, an illustrative operational flow diagram is shown for biometrically authenticated access control in accordance with the embodiments of FIGS. 1 and 2. As will be understood by those skilled in the art, for purposes of clarity of exposition, this illustrative operation flow does not necessarily describe all steps that may be implemented in practice to provide a more user friendly or robust process. For instance, as will be understood below, upon certain failed conditions (e.g., biometric authentication) additional steps may be implemented to prompt the user or otherwise provide the user with additional opportunity to re-enter data (e.g., fingerprint scan).

In this illustrative embodiment, for purposes of illustration, the process begins (step 700) as the RFID unit (i.e., RFID unit 102 or 402) is within the interrogation field zone of reader/interrogator 202. It is noted, however, that in various embodiments, initiation of such a process is not contingent on being within the interrogation field zone; for instance, the RFID unit may have its own power source (e.g., for operating the biometric sensor and the processing circuitry), RFID unit 102 or 402 periodically scans for user biometric data input (step 702). If no biometric input is received within a predetermined time interval or if a received biometric input (step 702) is not valid (step 710), then the RFID unit transmits an invalid (e.g., identity-independent code) to reader/interrogator 202. It is noted that while transmission of code information by the RFID unit may be in response to a reader/interrogation signal, in some embodiments, the RFID unit may transmit code information in response to a user initiated input (e.g., using keypad 424 or biometric sensor 426).

If a received biometric input (step 702) is valid (step 710), then the RFID tag is programmed with a valid biometric code (step 712). As described herein, such programming may be performed by storing the valid biometric code in a memory location (e.g., register or buffer) that is accessed for modulating the signal transmitted by the RFID unit or by updating a pointer to memory. In RFID unit 102, control logic or processing circuitry present on tag IC 104 performs this programming function. In various implementations of RFID unit 402, processor 403 communicates to tag IC 404 via coil component either the actual valid code value or information indicating that the valid code value should be programmed into memory 405 by tag IC 404, which receives and processes the programming communication from processor 403.

Upon completion of the programming (step 712), the RFID unit may further transmit the valid biometric code to the external reader/interrogator 202. As described hereinabove, in this illustrative implementation, the biometrically authenticated valid code remains as the actively programmed code for transmission for a predetermined time period. Tag IC 104 or processor 403 keeps track of this time period through at least one internal timer (step 716). If the timer has not expired, the valid code remains programmed as the data for transmission. If the timer expires, then the RFID tag is reprogrammed with an invalid code (step 718).

The present invention has been illustrated and described with respect to specific embodiments thereof, which embodiments are merely illustrative of the principles of the invention and are not intended to be exclusive or otherwise limiting embodiments. Accordingly, although the above description of illustrative embodiments of the present invention, as well as various illustrative modifications and features thereof, provides many specificities, these enabling details should not be construed as limiting the scope of the invention, and it will be readily understood by those persons skilled in the art that the present invention is susceptible to many modifications, adaptations, variations, omissions, additions, and equivalent implementations without departing from this scope and without diminishing its attendant advantages. For instance, except to the extent necessary or inherent in the processes themselves, no particular order to steps or stages of methods or processes described in this disclosure, including the figures, is implied. In many cases the order of process steps may be varied, and various illustrative steps may be combined, altered, or omitted, without changing the purpose, effect or import of the methods described. It is further noted that the terms and expressions have been used as terms of description and not terms of limitation. There is no intention to use the terms or expressions to exclude any equivalents of features shown and described or portions thereof. Additionally, the present invention maybe practiced without necessarily providing one or more of the advantages described herein or otherwise understood in view of the disclosure and/or that may be realized in some embodiments thereof. It is therefore intended that the present invention is not limited to the disclosed embodiments but should be defined in accordance with the claims that follow.

What is claimed:

1. A radio frequency identification unit, comprising:
a radio frequency identification transponder which comprises a memory and an antenna which is operable to receive interrogation signals and transmit response signals, wherein the transponder is operable to transmit via the antenna, in response to an interrogation signal received by the antenna, a response signal including data from the memory; and
circuitry included within the unit which comprises a reactive coupling to the antenna, the circuitry being operable to generate data to be included in response signals and program the transponder with the generated data, via the reactive coupling and the antenna, such that the memory includes generated data to be included in a respective response signal;
the transponder being operable to transmit via the antenna in response to respective interrogation signals a plurality of response signals, wherein at least one of the plurality of response signals includes different data including generated data from the memory in accordance with programming or the transponder by the circuitry.

2. The radio frequency identification unit according to claim 1, wherein the circuitry is operable to generate the data to be included in a response signal of the plurality of response signals according to a unique identifier associated with the radio frequency identification unit.

3. The radio frequency identification unit according to claim 2, comprising a biometric sensor coupled to condition the programming of data by the circuitry according to the unique identifier based upon a result of a biometric authentication of a user by the biometric sensor.

4. The radio frequency identification unit according to claim 1, comprising a biometric sensor coupled to condition the programming of data by the circuitry based upon a result of a biometric authentication of a user by the biometric sensor.

5. The radio frequency identification unit according to claim 1, wherein the antenna comprises a winding and the reactive coupling comprises a winding coupled to the antenna winding.

6. A method of controlling data transmitted by an RFID unit that comprises an RFID transponder which includes a memory and an antenna which is operable to receive interrogation signals and transmit response signals, wherein the transponder is operable to transmit via the antenna, in response to an interrogation signal received by the antenna, a response signal including data from in the memory, the method comprising:

the circuitry within the RFID unit programming the transponder with data which is to be included in response signals, the programming comprising generating data which is to be included in response signals and providing the generated data to the memory, via a reactive coupling in the circuitry and the antenna, such that the memory includes generated data to be included in a respective response signal; and
the transponder transmitting via the antenna in response to respective interrogation signals a plurality of response signals, wherein at least one of the plurality of response signals includes different data including generated data from the memory in accordance with programming of the transponder by the circuitry.

7. The method according to claim 6, comprising performing biometric authentication of a user and conditioning the programming of the RFID transponder on biometric authentication of the user.

8. The method according to claim 6, wherein programming the transponder comprises programming the transponder with data that includes a valid access code, and a predetermined time period thereafter programming the transponder with data that does not comprise a valid access code.

9. The method according to claim 8, comprising the circuitry programming the transponder after expiration of the predetermined time period with data which comprises an invalid access code.

10. The radio frequency identification unit according to claim 1, comprising integrated circuit which includes at least the transponder.

11. The radio frequency identification unit according to claim 1, comprising an integrated circuit which includes at least the transponder, wherein:
the antenna comprises a winding coupled to the transponder;
the reactive coupling comprises a winding coupled to the antenna winding;
the memory in the integrated circuit stores data to be transmitted in a response signal; and
the circuitry is operable to store, via the winding of the reactive coupling and the winding of the antenna, data to be transmitted in a response signal in the memory in the integrated circuit.

12. The radio frequency identification unit according to claim 1, comprising an integrated circuit which includes at least the transponder, wherein:
the antenna comprises a winding coupled to the transponder;
the reactive coupling comprises a winding coupled to the antenna winding;
the memory in the integrated circuit stores data to be transmitted in a response signal; and
the circuitry is operable to designate, via the winding of the reactive coupling and the winding of the antenna, data to be transmitted in a response signal which is stored in the memory in the integrated circuit.

* * * * *